United States Patent [19]
Ishikawa et al.

[11] 3,900,126
[45] Aug. 19, 1975

[54] METALLIC CAN GLUED WITH SYNTHETIC RESIN PRODUCT

[75] Inventors: Katsukiyo Ishikawa, Yamatokouriyama; Takayuki Shibata, Osaka, both of Japan

[73] Assignee: Nippon Paint Co., Ltd., Japan

[22] Filed: July 3, 1973

[21] Appl. No.: 376,175

[30] Foreign Application Priority Data
July 3, 1972 Japan.............................. 47-66538
Mar. 24, 1973 Japan.............................. 48-33856

[52] U.S. Cl. .................... 220/75; 220/75; 428/209; 428/425
[51] Int. Cl. ............................................. B44d 1/02
[58] Field of Search ............ 161/99, 139, 147, 190, 161/213, 216; 117/43, 132 R, 161 KP, 132 B, 161 UZ, DIG. 7; 206/1; 220/62, 75, 83; 138/145, 170, 177

[56] References Cited
UNITED STATES PATENTS
3,156,659  11/1964  Robitschek ..................... 161/213 X
3,402,086  9/1968   Smith et al...................... 161/216 X
3,600,468  8/1971   Bohme............................ 161/216 X
3,764,458  10/1973  Ziegel ............................. 161/190
3,765,928  10/1973  Smarook............................. 117/72
3,767,521  10/1973  Glaser et al......................... 161/216
3,773,589  11/1973  Kaiser et al......................... 156/218

Primary Examiner—Thomas J. Herbert, Jr.
Assistant Examiner—Bruce H. Hess
Attorney, Agent, or Firm—Wenderoth, Lind & Ponack

[57] ABSTRACT

A metallic can glued with a synthetic resin composition comprising an olefin copolymer having a carboxyl group in the side-chain, preferably together with a polyurethane resin, which has not only an excellent adhesive strength and a superior sealing property but also such other advantages that the glued part is hardly affected with its contents and the whole surface is available for printing.

9 Claims, No Drawings

METALLIC CAN GLUED WITH SYNTHETIC RESIN PRODUCT

The present invention relates to a metallic can glued with a synthetic resin.

Hitherto, a metallic can has been generally manufactured by the application of soldering. This is due to many advantages of soldering such as the simplicity in operation, the excellence in adhesive strength and sealing property, and the like. On the other hand, however, the application of soldering is restricted more or less in materials available. Namely, materials other than tin plate (e.g. chromium plated steel plate, chemically treated steel plate, aluminum plate) can not be well soldered. Further, washing with water is required to prevent any corrosion caused by residual flux. Furthermore, the soldered part can not be printed so that a good appearance is not assured. Moreover, environmental pollution is inevitably caused by the vaporization of lead in the course of melting solder. In addition, plant equipments are attacked with flux vapors.

In order to overcome the said drawbacks present in soldering for the manufacture of metallic cans, various attempts have been made. For instance, welding was proposed to manufacture cans, but it is slower than soldering in the manufacture speed. Further, for instance, glueing by the use of an adhesive agent comprising Nylon 12 was proposed. However, such glueing is apt to be influenced with some certain solvents. Moreover, the adhesive agent takes a film form, and its application to the seam portion of cans is difficult. In addition, it requires a relatively high temperature for adhesion.

As the result of various studies, it has now been found that the use of an olefin copolymer having a carboxyl group in the side chain as an adhesive agent in the manufacture of metallic cans makes the operation simple and assures a good quality of the produced cans.

According to the present invention, there is provided a metallic can glued with an adhesive agent comprising as an essential component an olefin copolymer having a carboxyl group in the side chain.

Any of can materials usually employed is available for the can material in this invention. Examples of preferred can materials are steel sheet, steel sheet coated with tin, aluminum, chromium, zinc or the like, steel sheet surface-treated with phosphoric acid, chromic acid or the like, aluminum sheet, etc. These materials may be coated with any conventional primer, when desired.

The adhesive agent used in this invention comprises as an essential component an olefin copolymer having a carboxyl group in the side chain. Preferably, it may contain a polyurethane resin as an optional component.

The olefin copolymer may be the copolymer of an aliphatic α-olefin having not more than 10 carbon atoms with an α,β-ethylenically unsaturated carboxylic acid in a molar ratio of 80 : 20 to 99 : 1. Examples of the aliphatic α-olefin are ethylene, propylene, butene-1, pentene-1, neohexene-1, octene-1, etc. Examples of the α,β-ethylenically unsaturated carboxylic acid are acrylic acid, methacrylic acid, ethacrylic acid, itaconic acid, maleic acid, fumaric acid, etc. When these unsaturated carboxylic acids are dibasic acids, those may be used in the form of free acid or of half ester.

If desired, the olefin copolymer may include any monomeric unit derived from copolymerizable monomers other than the said aliphatic α-olefin and the said α,β-ethylenically unsaturated carboxylic acid. Examples of the copolymerizable monomer are acrylic esters, methacrylic esters, styrene, vinyl chloride, vinyl acetate, acrylonitrile, methacrylonitrile, etc.

Among various olefin copolymers utilizable in this invention, particularly preferred is the copolymer of ethylene with an α,β-ethylenically unsaturated carboxylic acid having 3 to 8 carbon atoms, especially in a molar ratio of 80 : 20 to 95 : 5. More particularly, such copolymer is favored to have a melt index of 30 to 300 dg/min.

The olefin copolymer may be used in the form of aqueous dispersion or powder. It may be also used in the form of film, in the form of dispersion in an organic solvent, or the like. When used in the form of aqueous dispersion, the olefin copolymer is favored to be neutralized in a neutralization degree of 30 to 100 %, particularly of 40 to 80 %, with an appropriate base such as ammonia, morpholine, an alkanolamine, triethylamine, sodium hydroxide or potassium hydroxide. More particularly, the olefin copolymer may be first admixed with water and the base, heated at 160 to 180°C while stirring and the admixed with water to make an oil-in-water type emulsion containing 50 % by weight or more of the olefin copolymer, which is per se utilizable as an adhesive agent.

In order to make the performance of seaming smooth and the packing effect better, the incorporation of a polyurethane resin into the adhesive agent as above prepared is preferred.

As the polyurethane resin, there may be used the product from the reaction of an isocyanate compound with a polyether or a polyester. Examples of the isocyanate compound are tolylene diisocyanate, 4,4'-diphenylmethane diisocyanate, tolidine diisocyanate, hexamethylene diisocyanate, m-xylylene diisocyanate and their derivatives. The polyether may be the one having at least two active hydrogen atoms such as polyoxypropylene glycol, the addition product of polyoxypropylene and glycerol, the addition product of polyoxypropylene and trimethylolpropane, the addition product of polyoxypropylene and 1,2,6-hexanetriol, the addition product of polyoxypropylene and pentaerythritol, the addition product of polyoxypropylene and sorbitol, methylene-bis-phenyldiisocyanate, polytetrafuran polyether of which the chain is elongated with hydrazine, and their derivatives. The polyester may be the one having at least two active hydrogen atoms such as the reaction product of adipic acid or phthalic anhydride with ethylene glycol, propylene glycol, 1,3-butylene glycol, 1,4-butylene glycol, diethylene glycol, 1,2,6-hexanetriol, trimethylolpropane or 1,1,1-trimethylolethane.

Although the polyurethane can be used in the form of solution, dispersion, powder, film or any other form, the most preferred is to employ the same in an aqueous dispersion form. In this case, the concentration of the resin may be from 10 to 80 % by weight, preferably from 20 to 60 % by weight. For instance, the desired aqueous dispersion is obtainable by dispersing the reaction product of the polyether or polyester having at least two active hydrogen atoms with excess of the isocyanate compound as mentioned above into water by the aid of a surface active agent (which may be anionic, cationic or nonionic) and elongating the chain by the use of a primary diamine (e.g. ethylenediamine, m-tolylenediamine) or 1,2-bis(2- cyanoethylamino)ethane. In alternative, the desired aqueous dispersion may be obtained by dispersing a block isocyanate compound, which can be prepared by adding excess of the said isocyanate compound to a polyether having three or more hydroxyl groups in one molecule and inactivating the residual NCO group by phenol, into water in the presence of a surface active agent (which may be nonionic).

In the present invention, it is favored that the aqueous dispersion of the olefin copolymer is admixed with the aqueous dispersion of the polyurethane resin to use. The mixing ratio may be appropriately selected to make the weight ratio of the olefin copolymer and the polyurethane resin being 5 : 100 to 100 : 5. The resin concentration in the resultant mixture may be from 10 to 60 % by weight, preferably from 20 to 50 % by weight.

When desired, any additive may be further incorporated into the thus prepared adhesive composition. Examples of such additives are epoxy resins (e.g. bisphenol A type epoxy resin, bisphenol F type epoxy resin, tetrahydroxyphenylmethane type epoxy resin, novolack type epoxy resin, polyalcohol polyglycol type epoxy resin, glycerol triether type epoxy resin, olefin type epoxy resin), phenol resins (e.g. resol type phenol resin, novolak type phenol resin), melamine resins (e.g. trimethylmelamine resin, melamine-urea-formaldehyde condensation resin), polyester resins (e.g. polyalcohol-dibasic acid condensation alkyd resin, polyethylene terephthalate resin, polyethylene isophthalate resin), $\alpha,\beta$-ethylenically unsaturated carboxylic acid-polymerizable monomer copolymer resins (e.g. vinyl acetateacrylic acid copolymer resin, styrene-maleic anhydride copolymer resin), etc. Moreover, fillers, dispersing agents, viscofiers and the like may be incorporated into the adhesive composition insofar as such incorporation produces any improvement, for instance, in heat resistance, sealing property and the like. In case of these additives being incorporated, the amount may be preferably not more than 100 parts by weight to 100 parts by weight of the combination of the olefin copolymer and the polyurethane resin.

The thus prepared aqueous dispersion of the adhesive agent may be applied to the parts to be seamed of metallic plates which were press worked into respective forms of ceiling board, shell plate and bottom plate by utilization of a proper spreader such as a seam cement applying roll or a can lining machine so as to provide a uniform film, e.g. of 0.8 to 0.05 mm in thickness. After the application, water in the adhesive layer as formed is vaporized, preferably in a dryer maintained, for instance, at 70° to 150°C. Thereafter, seaming and assembling of the whole can is performed by a can seamer, and the assembled product is heated at a temperature of 130° to 400°C (preferably of 150° to 250°C) for a period of 1 to 10 minutes to complete adhesion, whereby a synthetic resin glued metallic can is obtained.

When the olefin copolymer is used in the form of powder, it may be pulverized by the aid of any conventional crushing machine (e.g. turbo mill, atomizer), if necessary, equipped with a cooler using liquefied gas. The parts to be seamed of metallic plates are heated above 90°C, the olefin copolymer powder is applied thereto to make a uniform coating, for instance, of 0.8 to 0.05 mm in thickness, and then seaming and assembling are performed by the aid of a can seamer. The thus assembled product is heated at 130° to 400°C (preferably at 150° to 250°C) to obtain a synthetic resin glued metallic can.

Practical and presently preferred embodiments of this invention are illustratively shown in the following Examples.

EXAMPLE 1

In a 0.5 liter volume autoclave equipped with an agitator, there were charged ethylene-acrylic acid copolymer (acrylic acid content, 18 % by weight; melt index, 300 dg/min.) (100 g), 28 % ammonia water (10 g) and water (20 g), and the resulting mixture was heated at 150°C for 10 minutes while agitation. After the portionwise addition of water (130 g), the resultant mixture was agitated at 90°C for 30 minutes and cooled to room temperature. Then, bisphenol A type epoxy resin (average molecular weight, 380; epoxy equivalent, 190) (20 g) was added thereto while agitation to make an aqueous dispersion to be used as an adhesive agent.

A chromium plated steel sheet (0.32 mm thick) was cut to make the plates of pre-determined sizes for the trunk, ceiling and bottom parts of a 18 liter volume can, and the plates were subjected to press processing. The said adhesive agent was applied uniformly on the seam portions of the plates in 3 mm wide and 0.25 mm thick and by the aid of a can lining machine. After keeping in a dryer at 130°C for about 3 minutes in order to evaporate the water, the plates were assembled by the use of a can seamer according to the procedure as described in JIS (Japanese Industrial Standard) Z-1602, and the assembled product was kept in a dryer at 200°C for 1 minute whereby a 18 liter can (temper: 4 (for trunk), 2.5 (for ceiling and bottom)) was obtained.

No abnormality was found on the said can in the compression test and the leakage test carried out according to the procedure as described in JIS Z-1602 No. 6.

Comparison was made between the above manufactured can and a can manufactured in a conventional soldering procedure on some physical and mechanical properties. The results are shown in Table 1.

Table 1

| Can | Present invention | Soldered can |
|---|---|---|
| Adhesive strength between ceiling and trunk (kg/in) | 70 | 80 |
| Adhesive strength between trunk and trunk (kg/in) | above 100 | 60 |
| Leakage test (JIS-Z-1602 No. 6–1) | accepted | accepted |
| Compression test (JIS Z-1602 No. 6–2) | accepted | accepted |
| Drop test (2 m) | deformed without leakage | broken at glued part with leakage |
| Content test | | |
| Toluene | no change | no change |
| Methylethylketone | no change | no change |
| Ethyl acetate | no change | no change |
| N-Butanol | no change | no change |
| Salad oil | no change | no change |

EXAMPLE 2

Powdery ethylene-acrylic acid copolymer (acrylic acid content, 22 % by weight; melt index, 120 dg/min.; maximum particle size, 100 μ) (about 200 g) and liquid nitrogen (about 10,000 g) were put in a 20 liter volume turbo mill, pulverized for about 30 minutes and sieved to remove coarse particles of more than 100 μ in diameter. The resulting powder was used as an adhesive agent.

A tin plate (0.32 mm thick) was cut to make the plates of pre-determined sizes for the trunk, ceiling and bottom parts of a 18 liter volume can, and the plates were subjected to press processing. The said adhesive agent was sprayed on the seam portions of the plates pre-heated at 120°C by the aid of an infrared heater to make a uniform coating of about 0.1 mm in thickness. After cooling, the plates were assembled by the use of a can seamer as in Example 1, and the assembled product was kept in a dryer at 200°C for 1 minute whereby a 18 liter can (temper: 4 (for trunk), 2.5 (for ceiling and bottom)) was obtained.

No abnormality was found on the said can in the compression test and the leakage test carried out according to the procedure as described in JIS Z-1602 No. 6.

EXAMPLE 3

In a 0.5 liter volume autoclave equipped with an agitator, there were charged ethylene-acrylic acid copolymer as in Example 1 (100 g), 28 % ammonia water (8 g) and water (20 g), and the resulting mixture was heated at 150°C for 10 minutes while agitation. After the portionwise addition of water (180 g), the resultant mixture was agitated at 90°C for 30 minutes and cooled to room temperature to make an aqueous dispersion to be used as an adhesive agent.

Using a chromium plated steel sheet (0.32 mm thick) and the said adhesive agent, there was manufactured a 18 liter can (temper: 4 (for trunk), 2.5 (for ceiling and bottom)) as in Example 1.

No abnormality was found on the said can in the compression test and the leakage test carried out according to the procedure as described in JIS Z-1602 No. 6.

EXAMPLE 4

In a 0.5 liter volume autoclave equipped with an agitator, there were charged ethylene-acrylic acid-ethyl acrylate copolymer (acrylic acid content, 20 % by weight; ethyl acrylate content, 2 % by weight; melt index, 150 dg/min.) (100 g), 28 % ammonia water (8 g) and water (20 g), and the resulting mixture was heated at 150°C for 10 minutes while agitation. After the portionwise addition of water (180 g), the resultant mixture was agitated at 90°C for 30 minutes and cooled to room temperature. Then, trimethylolmelamine (5 g) was portionwise added thereto while agitation, and agitation was continued for about 10 minutes to make an aqueous dispersion to be used as an adhesive agent.

Using a chromium plated steel sheet (0.32 mm thick) and the said adhesive agent, there was manufactured a 18 liter can (temper: 4 (for trunk), 2.5 (for ceiling and bottom)) as in Example 1.

No abnormality was found on the said can in the compression test and the leakage test carried out according to the procedure as described in JIS Z-1602 No. 6.

EXAMPLE 5

In a 1 liter volume autoclave equipped with an agitator, there were charged polyvinyl clcohol (degree of polymerization, 1000; saponification degree, 88 %) (4 g) and water (400 g), and the resulting mixture was heated at 90°C while agitation to dissolve the polyvinyl alcohol.

Ethylene-acrylic acid copolymer (acrylic acid content, 10 % by weight; melt index, 55 dg/min.) (100 g) and 28 % ammonia water (5 g) were added thereto, and the resultant mixture (5 g) were added thereto, and the resultant mixture was kept at 100°C for 30 minutes while agitation. Then, bisphenol A type epoxy resin (average molecular weight, 380; epoxy equivalent, 190) (5 g) was added thereto while agitation to make an aqueous dispersion to be used as an adhesive agent.

A tin plate having an epoxy resin coating on the surface (0.32 mm thick) was cut to make the plates of pre-determined sizes for the trunk, ceiling and bottom parts of a 18 liter volume can, and the plate were subjected to press processing. The said adhesive agent was applied uniformly on the seam portions of the plates in 3 mm wide and 0.2 mm thick by the aid of a can lining machine. After keeping in a dryer at 130°C for about 3 minutes in order to evaporate the water, the plates were assembled by the use of a can seamer according to the procedure as described in JIS Z-1602, and the assembled product was kept in a dryer at 200°C for 1 minute whereby a 18 liter can (temper: 4 (for trunk), 2.5 (for ceiling and bottom)) was obtained.

No abnormality was found on the said can in the compression test and the leakage test carred out according to the procedure as described in JIS Z-1602 No. 6.

EXAMPLE 6

In a 0.5 liter volume autoclave equipped with an agitator, there were charged ethylene-acrylic acid copolymer as in Example 1 (100 g), 28 % ammonia water (10 g) and water (250 g), and the resulting mixture was heated at 95° to 98°C for 60 minutes while agitation. After cooling to 80°C, trimethylolpropane triglycidyl ether (15 g) was added thereto, and agitation was carried out for 10 minutes. The resultant mixture was cooled to room temperature, a 40 % aqueous dispersion of linear polyurethane resin (polyether type, OH/NCO = 1/1) (200 g) was added thereto, and agitation was further continued for 20 minutes to make an aqueous dispersion to be used as an adhesive agent.

A tin plate (0.32 mm thick) was cut to make the plates of pre-determined sizes for the trunk, ceiling and bottom parts of a 18 liter volume can, and the plates were subjected to press processing. The said adhesive agent was applied uniformly on the seam portions of the plates in 3 mm wide and 0.25 mm thick by the aid of a can lining machine. After keeping in a dryer at 100°C for about 3 minutes in order to evaporate the water, the plates were assembled by the use of a can seamer according to the procedure as described in JIS Z-1602, and the assembled product was kept in a dryer at 200°C for 1 minute whereby a 18 liter can (temper: 4 (for trunk), 2.5 (for ceiling and bottom)) was obtained.

No abnormality was found on the said can in the compression test and the leakage test carried out according to the procedure as described in JIS Z-1602 No. 6.

Comparison was made between the above manufactured can and a can manufactured in the similar manner but using an adhesive agent excluding the linear polyurethane resin on some physical and mechanical properties. The results are shown in Table 2.

Table 2

| Can | Linear polyurethane resin used | Linear polyurethane resin not used |
|---|---|---|
| Elongation in film (%) | 390 | 300 |
| 100 % modulus (Kg/cm$^2$) | 58 | 120 |
| T type peeling strength (kg/in) | 22 | 20 |
| Defective rate in seaming | 0/200 | 3/200 |
| Critical compressive force (kg/cm$^2$) | 3.0 | 1.5 |

From the above results, it is understood that the softening in the adhesive layer results in the improvement of the defective rate in seaming and the critical compressing force.

EXAMPLE 7

In a 1 liter volume autoclave equipped with an agitator, there were charged ethylene-acrylic acid copolymer as in Example 1 (100 g), 28 % ammonia water (10 g) and water (250 g), and the resulting mixture was heated at 95° to 98°C for 60 minutes while agitation. After cooling to 80°C, neopentylglycol diglycidyl ether (10 g) was added thereto, and the resultant mixture was agitated for 10 minutes and cooled to room temperature to make an aqueous dispersion (referred to as "adhesive agent A").

In a flask equpped with an agitator, polyethylene propylene adipate (ethylene unit/propylene unit = 2/1 (by mol); average molecular weight, 2,000) (93 g) and a mixture of 2,4-tolylene diisocyanate and 2,6-tolylene diisocyanate (80 : 20 by weight) (17.4 g) were charged, and the resulting mixture was agitated under nitrogen stream at 90°C for 2.5 hours to produce an intermediate polymer. In another flask equipped with an agitator, an oligopolyamide (amino equivalent, 170) (17 g) obtained by the reaction of adipic acid with excessive ethylene diamine, a cation surface active agent (2 g) and water (200 g) were charged, and the resultant mixture was agitated at room temperature. Under agitation at a high rotation speed, the said intermediate polymer was portionwise added thereto whereby an adhesive agent (referred to as "adhesive agent B") is obtained. The adhesive agent A was admixed with the adhesive agent B at room temperature, and agitation was effected for 10 minutes to make an adhesive composition.

Using a chromium plated steel sheet and the said adhesive composition, there was manufactured a 18 liter volume can (temper: 4 (for trunk), 2.5 (for ceiling and bottom)) as in Example 6.

No abnormality was found on the said can in the compression test and the leakage test carried out according to the procedure as described in JIS Z-1602 No. 6.

Comparison was made between the above manufactured can and a can manufactured in the similar manner but using an adhesive agent excluding the linear polyurethane resin on some physical and mechanical properties. The results are shown in Table 3.

Table 3

| Can | Linear polyurethane resin used | Linear polyurethane resin not used |
|---|---|---|
| Elongation in film (%) | 420 | 310 |
| 100 % modulus (kg/cm$^2$) | 47 | 120 |
| T type peeling strength (kg/in) | 21 | 20 |
| Defective rate in seaming | 0/200 | 4/200 |
| Critical compressive force (kg/cm$^2$) | 3.0 | 1.5 |

What is claimed is:

1. A metallic can having a glued layer on the seam portion, which is characterized in that the glued layer comprises an olefin copolymer having a carboxyl group in the side chain and a polyurethane resin in a proportion of 5 : 100 to 100 : 5 by weight, the olefin copolymer being the copolymer of an aliphatic $\alpha$-olefin having not more than 10 carbon atoms with an $\alpha,\beta$-ethylenically unsaturated carboxylic acid having 3 to 8 carbon atoms, which has a melt index of 30 to 300 dg/min, and the polyurethane resin being the reaction product of an isocyanate with either a polyether or a polyester.

2. The metallic can according to claim 1, wherein the glued layer is the one formed by the use of an aqueous dispersion containing the olefin copolymer and the polyurethane resin.

3. The metallic can according to claim 2, wherein the aqueous dispersion has a resin content of 10 to 60 % by weight.

4. The metallic can according to claim 3, wherein the resin content is 20 to 50 % by weight.

5. The metallic can according to claim 1, wherein the gluded layer has a thickness of 0.8 to 0.05 mm in the dried state.

6. The metallic can according to claim 1, wherein the olefin copolymer is the copolymer of the aliphatic $\alpha$-olefin with the $\alpha,\beta$-ethylenically unsaturated carboxylic acid at a molar ratio of 80 : 20 to 99 : 1.

7. The metallic can according to claim 6, wherein the olefin copolymer is the copolymer of ethylene with the $\alpha,\beta$-ethylenically unsaturated carboxylic acid in a molar ratio of 80 : 20 to 95 : 5.

8. The metallic can according to claim 1, wherein the glued layer further comprises an additive selected from the group consisting of epoxy resins, phenol resins, melamine resins, polyester resins and $\alpha,\beta$-ethylenically unsaturated carboxylic acid-polymerizable monomer copolymer resins.

9. The metallic can according to claim 8, wherein the amount of the additive is not more than 100 parts by weight of 100 parts by weight of the combination of the olefin copolymer and the polyurethane resin.

* * * * *